(12) United States Patent
Ishibashi

(10) Patent No.: US 10,911,780 B2
(45) Date of Patent: Feb. 2, 2021

(54) MULTI-VIEWPOINT IMAGE CODING APPARATUS, MULTI-VIEWPOINT IMAGE CODING METHOD, AND STORAGE MEDIUM

(71) Applicant: CANON KABUSHIKI KAISHA, Tokyo (JP)

(72) Inventor: Koji Ishibashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 829 days.

(21) Appl. No.: 15/264,074

(22) Filed: Sep. 13, 2016

(65) Prior Publication Data

US 2017/0078700 A1 Mar. 16, 2017

(30) Foreign Application Priority Data

Sep. 16, 2015 (JP) ................................ 2015-183346

(51) Int. Cl.
*H04N 19/597* (2014.01)
*H04N 19/44* (2014.01)
*H04N 13/02* (2006.01)
*H04N 13/239* (2018.01)
*H04N 13/00* (2018.01)
*H04N 13/243* (2018.01)
*H04N 13/161* (2018.01)

(52) U.S. Cl.
CPC ......... *H04N 19/597* (2014.11); *H04N 13/239* (2018.05); *H04N 13/161* (2018.05); *H04N 13/243* (2018.05); *H04N 2013/0081* (2013.01)

(58) Field of Classification Search
CPC ........... H04N 13/0048; H04N 13/0239; H04N 13/0242; H04N 19/597; H04N 2013/0081
See application file for complete search history.

(56) References Cited

U.S. PATENT DOCUMENTS

| 8,311,089 | B2* | 11/2012 | Ishikawa | .......... H04N 21/21805 |
| | | | | 341/110 |
| 8,810,683 | B2* | 8/2014 | Kotani | ................. H04N 5/2226 |
| | | | | 348/208.12 |
| 2007/0160135 | A1* | 7/2007 | Ishikawa | ................ H04N 5/247 |
| | | | | 375/240.01 |

(Continued)

FOREIGN PATENT DOCUMENTS

JP 2007-184741 A 7/2007

*Primary Examiner* — Joon Kwon
(74) *Attorney, Agent, or Firm* — Carter, Deluca & Farrell LLP

(57) ABSTRACT

In a process of coding multi-viewpoint images, the process is performed at a high speed while the amount of data is suppressed. A distance estimating unit that estimates a distance from a camera array including a plurality of camera units up to a subject, a determination unit that determines the number of first camera units independently coding image data among the plurality of camera units and an arrangement of the first camera units in the camera array based on the distance estimated by the distance estimating unit, and a control unit that operates each of the camera units as the first camera unit or as a second camera unit coding image data of the own camera unit by referring to image data of the first camera unit based on the number and the arrangement of the first camera units determined by the determination unit are included.

8 Claims, 14 Drawing Sheets

(56) References Cited

U.S. PATENT DOCUMENTS

2009/0129465 A1* 5/2009 Lai ................. H04N 19/597
375/240.02
2013/0329080 A1* 12/2013 Omori ............... H04N 5/23229
348/229.1

* cited by examiner

MULTI-VIEWPOINT IMAGE CODING APPARATUS, MULTI-VIEWPOINT IMAGE CODING METHOD, AND STORAGE MEDIUM

BACKGROUND OF THE INVENTION

Field of the Invention

The present invention relates to a multi-viewpoint image coding apparatus coding a multi-viewpoint image, a multi-viewpoint image coding method, and a storage medium.

Description of the Related Art

In recent years, various functions that cannot be implemented in a monocular camera have been attempted to be realized using images photographed at a plurality of viewpoints (hereinafter, referred to as plural viewpoint images or multi-viewpoint images). However, in order to realize such functions, images photographed by a plurality of cameras need to be processed, and the amount of data to be processed is enormous. For this reason, a technology for efficiently coding images photographed by a plurality of cameras altogether (hereinafter, referred to as a multi-viewpoint image coding technology) is of significance.

Conventionally, for a monocular camera, as one technology for compressing and coding image information, a technology for coding in compliance with a moving picture experts group (MPEG) standard is known, and, generally, MPEG2, MPEG4, MPEG4AVC, and the like are widely used. A main feature of such compressing and coding technologies is to code a difference between a picture of a predictive coding target (hereinafter, referred to as a predictive coding target picture) and a picture that has already been coded and reconfigured (hereinafter, referred to as a reference picture). More specifically, a discrete cosine transform (DCT) and quantization are performed for a difference between a predictive coding target picture and a reference picture, and variable-length coding is performed for a result of the quantization.

Here, a case will be described in which image data coded using the compressing and coding technology described above is to be decoded.

For example, image data coded according to the MPEG2 is configured by three types of pictures including an I picture, a P picture, and a B picture.

An I picture is a picture that is coded without reference to any other picture. Thus, when an I picture is to be decoded, the I picture can be decoded as a single object. When a P picture is coded, an I picture or a P picture of the past is referred to. Then, the P picture is coded using a difference from a picture that has been referred to. Thus, when a P picture is decoded, an I picture or a P picture of the past is referred to. For this reason, it is necessary to decode the I picture or the P picture to be referred to in advance.

When a B picture is coded, an I picture or a P picture of the past and an I picture or a P picture of the future are referred to. Then, the B picture is coded using a difference from a picture that has been referred to. Thus, when the B picture is decoded, previous and next I pictures or P pictures are referred to. For this reason, it is necessary to decode the previous and next I pictures or P pictures to be referred to in advance.

In a multi-eye camera, by using only the compressing and coding technology described above, the amount of data is increased in proportion to the number of cameras, and thus, a compressing and coding process between cameras (between multi-viewpoints) is performed. In recent years, a multi-viewpoint video coding technology for coding moving image data captured from a plurality of viewpoints (moving image data of a plurality of channels) in compliance with an H.264/MVC standard has been known. A plurality of pieces of moving image data is data acquired by imaging a subject from a plurality of viewpoints and thus have a feature that the moving image data is similar. In the multi-viewpoint video coding technology described above, the compression rate is improved using this feature (correlation). More specifically, according to the multi-viewpoint video coding technology described above, moving image data of one channel is coded by referring to moving image data of the other channels. The H.264/MVC standard, for example, is used when a three-dimensional image that can be felt to be stereoscopic by a viewer is coded.

In Japanese Patent Laid-Open No. 2007-184741, a technique for coding a video sequence acquired from a plurality of video cameras has been proposed. In the technique disclosed in Japanese Patent Laid-Open No. 2007-184741, a video sequence of a video camera (base video camera) arranged at a center position of all the video cameras is independently coded, and a video sequence of an adjacent video camera is coded by referring to the video sequence that has been coded in advance. Thereafter, a similar process is repeated for a video sequence of a video camera that is adjacent to the video camera of which the video sequence has been coded, and image data of video cameras disposed on the periphery of the base video camera is sequentially coded.

However, in the technique disclosed in Japanese Patent Laid-Open No. 2007-184741, since only the video camera arranged at the center position of all the video cameras is set as a base video camera, and a coding process is sequentially performed from the base video camera, there is concern that it takes time to perform the coding process. Accordingly, it is predicted that a problem occurs at the time of performing communication between blocks requiring real time processing, for example, at the time of transmitting data from an imaging system (an imaging sensor or the like) to a developing system (an image processing unit or the like).

Thus, an object of the present invention is to provide a multi-viewpoint coding apparatus increasing the processing speed in a process of coding a multi-viewpoint images while suppressing the amount of data, a multi-viewpoint image coding method, and a storage medium.

SUMMARY OF THE INVENTION

According to the present invention, there is provided a multi-viewpoint image coding apparatus coding image data, which has a different viewpoint, acquired from each of a plurality of camera units. The multi-viewpoint image coding apparatus includes: a distance estimating unit that estimates a distance from a camera array including the plurality of camera units up to a subject; a determination unit that determines the number of first camera units independently coding image data among the plurality of camera units and an arrangement of the first camera units in the camera array based on the distance estimated by the distance estimating unit; and a control unit that operates each of the camera units as the first camera unit or as a second camera unit coding image data of the own camera unit by referring to image data of the first camera unit based on the number and the arrangement of the first camera units determined by the determination unit.

Further features of the present invention will become apparent from the following description of exemplary embodiments (with reference to the attached drawings).

DESCRIPTION OF THE EMBODIMENTS

Embodiment 1

Figure 1A:
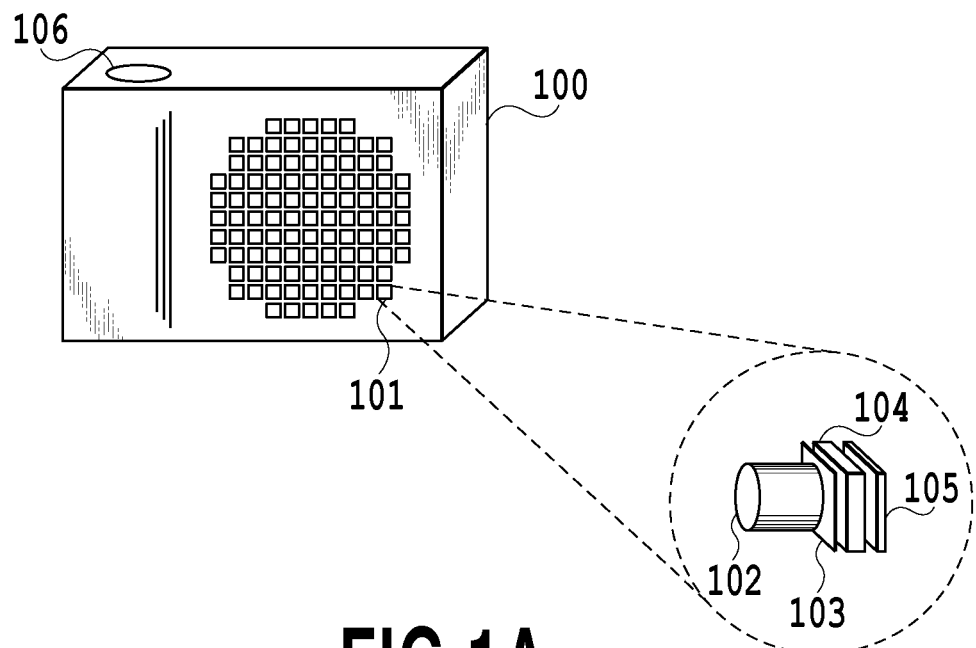
FIGS. 1A and 1B are explanatory diagrams that illustrate an overview of an imaging apparatus of a multi-eye type according to a first embodiment.

Hereinafter, an embodiment of the present invention will be described with reference to the drawings. A configuration illustrated as below is merely an example, and the present invention is not limited to the configuration illustrated in the drawing.

[Overview of Apparatus]

Figure 1B:
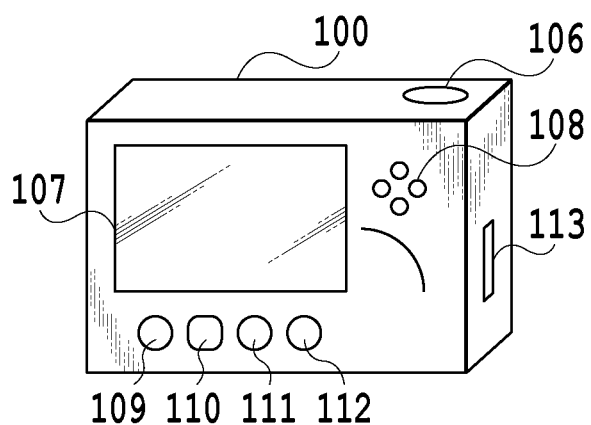

FIGS. 1A and 1B are explanatory diagrams that illustrate an overview of an imaging apparatus (hereinafter, referred to as a multi-eye camera) 100 of a multi-eye type according to a first embodiment. FIG. 1A illustrates an overview diagram acquired by seeing the multi-eye camera 100 from the front side. FIG. 1B illustrates an overview diagram acquired by seeing the multi-eye camera 100 from the back side.

As illustrated in FIG. 1A, a camera array in which a plurality of camera units 101 are arranged is arranged on a front face (a face disposed on the front side in FIG. 1A) of the multi-eye camera 100, and a release button 106 directing start of photographing is arranged on an upper face (a face disposed on an upper side in FIG. 1A). Each camera unit 101 includes: an imaging lens 102; an optical filter 103; an imaging device 104; and a peripheral circuit 105. In this embodiment, images of a plurality of viewpoints are acquired by performing simultaneous photographing using the camera array.

As illustrated in FIG. 1B, on a side face (a face disposed on the right side in FIG. 1B) of the multi-eye camera 100, a memory card slot 113 for mounting a recording medium such as a semiconductor memory card is arranged. In addition, instead of the memory card slot 113, a serial bus interface such as a USB may be arranged such that a storage device such as a hard disk drive is connected through a serial bus. In addition, on a rear face (a face disposed on the front side in FIG. 1B) of the multi-eye camera 100, a display unit 107, a key group 108 arranged in a cross shape, a power button 109, a menu button 110, a determination button 111, a cancel button 112, and the like are arranged.

The multi-eye camera 100 according to this embodiment does not include an optical finder, and thus, a user performs a framing operation (focusing or layout checking) using an image displayed on the display unit 107. On the display unit 107, a live view displaying a capture range in real time, a camera setting menu displayed when the menu button 110 is pressed, and the like are displayed. In addition, in a case where the menu button 110 is pressed in a state in which the camera setting menu is displayed, the live view is displayed again on the display unit 107.

In the state in which the camera setting menu is displayed, the user changes the state of a selected setting item by operating the key group 108 and determines the change by pressing the determination button 111 or cancels the change by pressing the cancel button 112. As setting items that can be changed on the camera setting menu, there are switching among capture modes such as a moving image capture mode and a still image capture mode, a diaphragm value, a shutter speed, and the like.

In description presented below, while a diaphragm value, a shutter speed, and a zoom position will be described to be set to same values for the camera units 101 configuring the camera array, different values may be set to each camera unit 101. In addition, regarding a photographing distance (focusing), for example, a CPU 200 to be described later calculates a distance up to a subject corresponding to an automatic focus (AF) range-finding frame designated by an operation for a touch screen or the key group 108 of the display unit 107 and sets the calculated distance as a photographing distance for all the camera units.

[Configuration of Apparatus]

Figure 2:
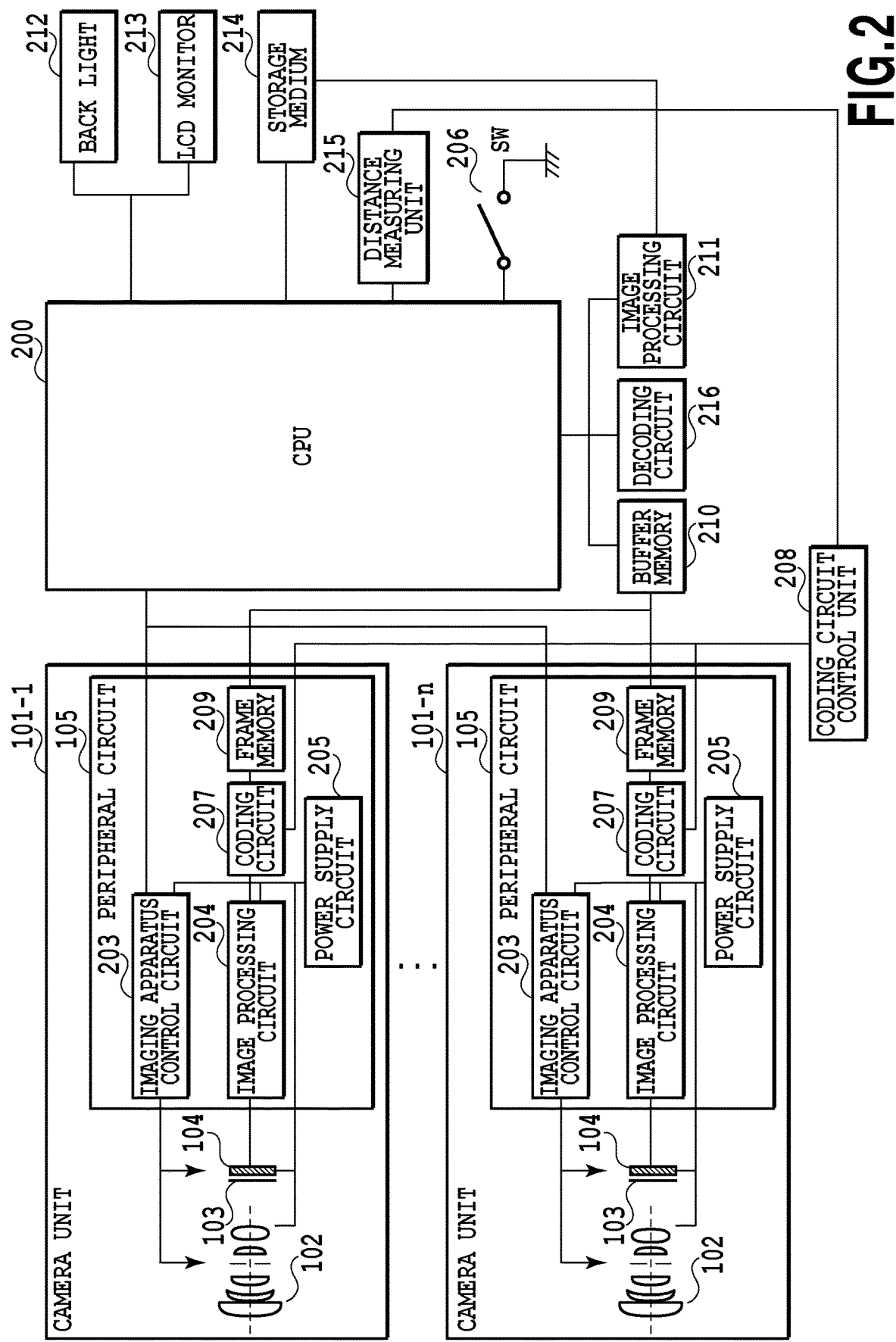
FIG. 2 is an explanatory diagram that illustrates an example of the configuration of an imaging apparatus of a multi-eye type according to the first embodiment.

First, the configuration of the multi-eye camera 100 according to the first embodiment will be described. FIG. 2 is an explanatory diagram that illustrates an example of the configuration of the multi-eye camera 100 according to the first embodiment.

The multi-eye camera 100 according to this embodiment, as illustrated in FIG. 2, includes: a microprocessor (CPU) 200; a plurality of camera units 101 (101-1 to 101-n); an image processing unit 211; a distance estimating unit 215; a switch (SW) 206; a coding circuit control unit 208; a buffer memory 210; a decoding circuit 216; a back light 212; and an LCD monitor 213.

The CPU 200, by executing a control program stored in a ROM built therein or the like, performs image processing of image data output by each camera unit 101 and controls the overall operation of the multi-eye camera 100 by controlling each constituent element to be described later. The control targets for the CPU 200 include display control of the display unit 107 such as an LCD, control of the back light of the display unit 107, power control of each camera unit 101, and the like.

Each camera unit 101, as described above, includes: the imaging lens 102; the optical filter 103; the imaging device 104; and the peripheral circuit 105.

The peripheral circuit 105 includes: an imaging apparatus control circuit 203; an image processing circuit 204; a power supply circuit 205; a coding circuit 207; and a frame memory 209.

The imaging apparatus control circuit 203 performs various kinds of control processes of the imaging lens 102, shutter control, and the like. For example, the imaging apparatus control circuit 203 performs photographing distance control driving the imaging lens 102 in accordance with a photographing distance, diaphragm control driving a light quantity adjusting device of the imaging lens 102 in accordance with a diaphragm value, and shutter control driving the imaging device 104 in accordance with an exposure time.

The image processing circuit 204 processes an image signal output by the imaging device 104, converts the processed image signal into digital data, and transmits acquired image data (raw image data) to the coding circuit 207.

The power supply circuit 205 supplies power to each constituent element of the camera unit 101.

The coding circuit 207 codes image data received from the image processing circuit 204 and stores coded image data in the frame memory 209.

The frame memory 209, for example, is a RAM. The image data stored in the frame memory 209 is transmitted to the buffer memory 210 by the CPU 200.

The coding circuit control unit 208 controls the coding circuit 207 based on information output from the distance estimating unit 215. The coding circuit control unit 208 will be described later in detail.

The decoding circuit 216 decodes coded image data that is stored in the buffer memory 210. The decoding circuit 216 transmits raw image data acquired through the decoding process to the image processing unit 211.

The image processing unit 211 performs image processing for image data received from the decoding circuit 216. The image processing unit 211 composes image data of the camera units that is received from the decoding circuit 216, thereby generating new image data. In this embodiment, as the new image data, panorama image data is generated. In addition, the image processing unit 211 may be configured to generate image data other than the panorama image data. Furthermore, in a case where image processing can be performed for image data before decoding, the image processing unit 211 may be configured not to arrange the decoding circuit 216 but to directly input the image data stored in the buffer memory 210 to the image processing unit 211. The image processing unit 211 converts the new image data into an image data format that is displayable on the display device such as the display unit 107 and stores the converted new image data into the recording medium 214.

The distance estimating unit 215 estimates a distance from the camera array to a closest subject based on the image data stored in the buffer memory 210 by using a distance estimating method to be described later. The closest subject is a subject having a shortest distance up to the camera unit. The distance estimating unit 215 transmits information representing a distance up to the closest subject (hereinafter, referred to as closest subject distance information) to the coding circuit control unit 208.

The back light 212 and the LCD monitor 213 configure the display unit 107 illustrated in FIG. 1B.

Figure 3:
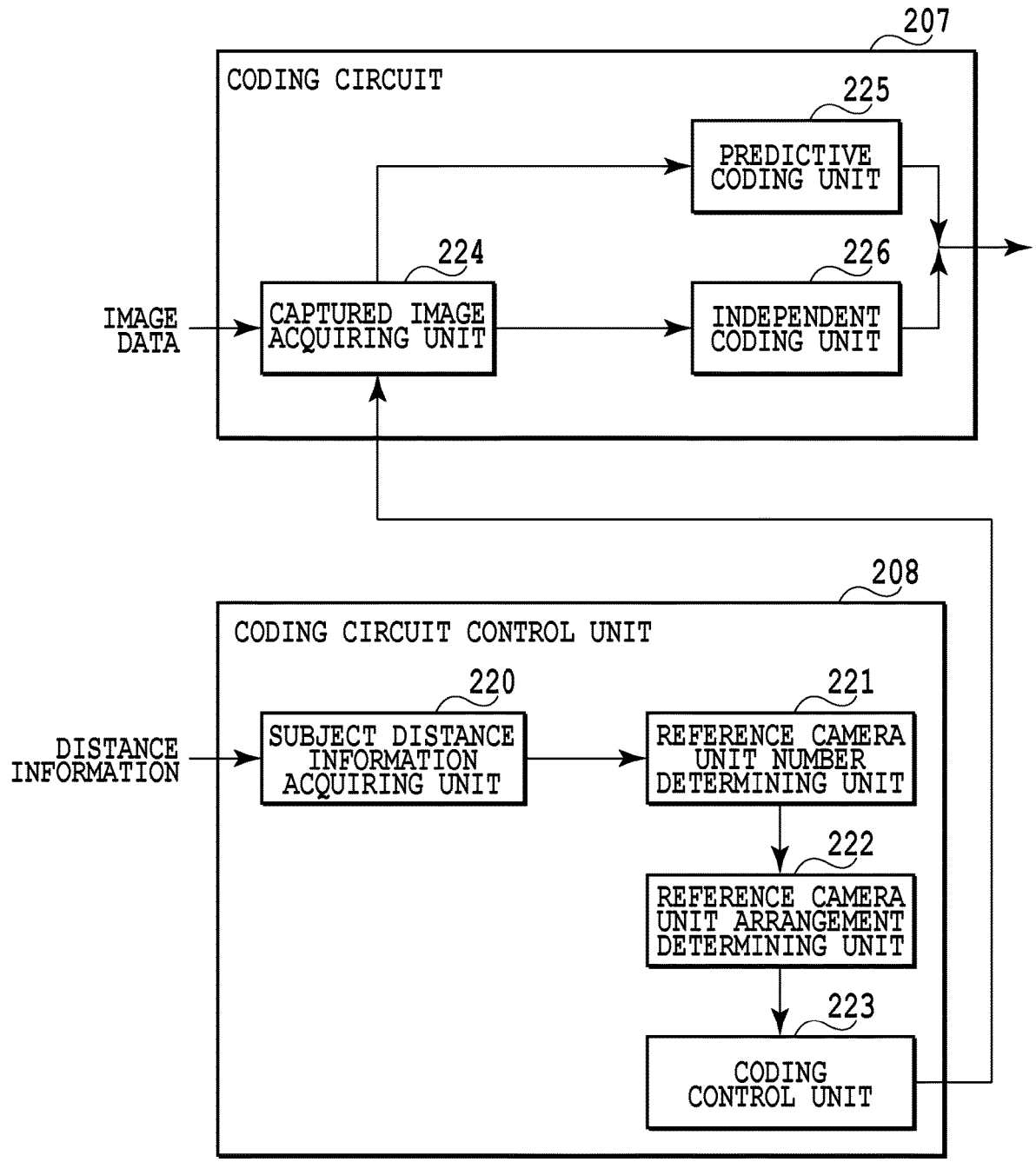
FIG. 3 is an explanatory diagram that illustrates the internal configuration of a coding circuit and a coding circuit control unit.
Figure 4A:
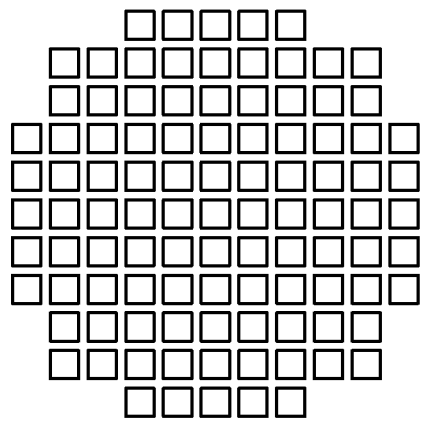
FIGS. 4A to 4D are explanatory diagrams that illustrate examples of the arrangement of camera units.
Figure 4B:
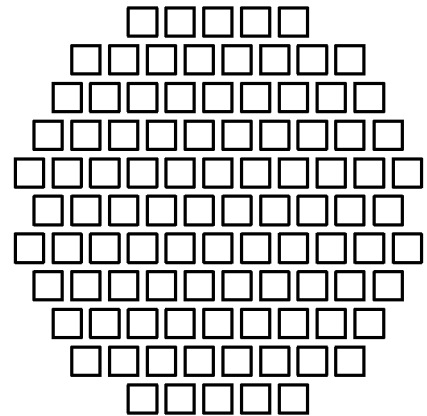
Figure 4C:
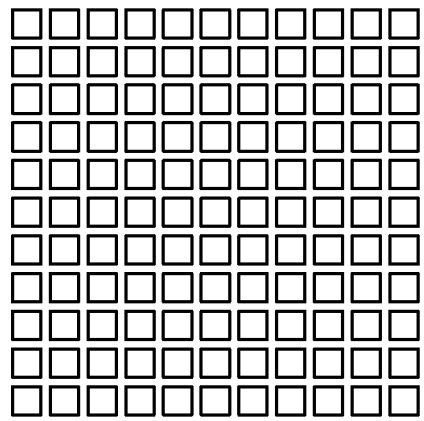
Figure 4D:
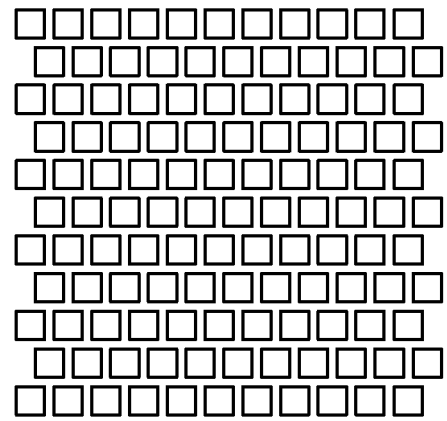

Here, the coding circuit 207 and the coding circuit control unit 208 will be described in detail with reference to FIG. 3. FIG. 3 is an explanatory diagram that illustrates the internal configuration of the coding circuit 207 and the coding circuit control unit 208.

As illustrated in FIG. 3, the coding circuit 207 includes: a captured image acquiring unit 224; a predictive coding unit 225; and an independent coding unit 226.

The captured image acquiring unit 224 receives a control signal to be described later. The predictive coding unit 225 performs predictive coding in accordance with the control signal. The independent coding unit 226 performs independent coding in accordance with the control signal.

In a case where each camera unit includes a CPU and the like, the CPU may be configured to perform the processes of the predictive coding unit 225 and the independent coding unit 226.

As illustrated in FIG. 3, the coding circuit control unit 208 includes: a subject distance information acquiring unit 220; a reference camera unit number determining unit 221; a reference camera unit arrangement determining unit 222; and a coding control unit 223. Hereinafter, a camera unit that independently performs coding of image data will be referred to as a reference camera unit (or a first camera unit). On the other hand, a camera unit that performs coding by referring to the image data of the reference camera unit will be referred to as a referring camera unit (or a second camera unit).

The subject distance information acquiring unit 220 receives the closest subject distance information described above. The reference camera unit number determining unit 221 determines the number of reference camera units. The reference camera unit arrangement determining unit 222 determines an arrangement in the camera array of reference camera units. The coding control unit 223 transmits the control signal to each camera unit 101.

[Arrangement of Camera Unit]

FIGS. 4A to 4D are explanatory diagrams that illustrate examples of the arrangement of the camera units 101. In FIGS. 4A to 4D, a square represents each camera unit 101, and a row of squares represents an example of the arrangement of the camera units 101 of a case where the multi-eye camera 100 is seen from the front side. As arrangement patterns of the camera units 101, arrangement patterns as illustrated in FIGS. 4A to 4D are considered. However, the arrangement pattern of the camera units 101 is not limited to the arrangement patterns illustrated in FIGS. 4A to 4D. Hereinafter, description will be presented based on an assumption that the camera units 101 of the multi-eye camera 100 are arranged in the arrangement pattern illustrated in FIG. 4C.

[Imaging State Transition]

Figure 5:
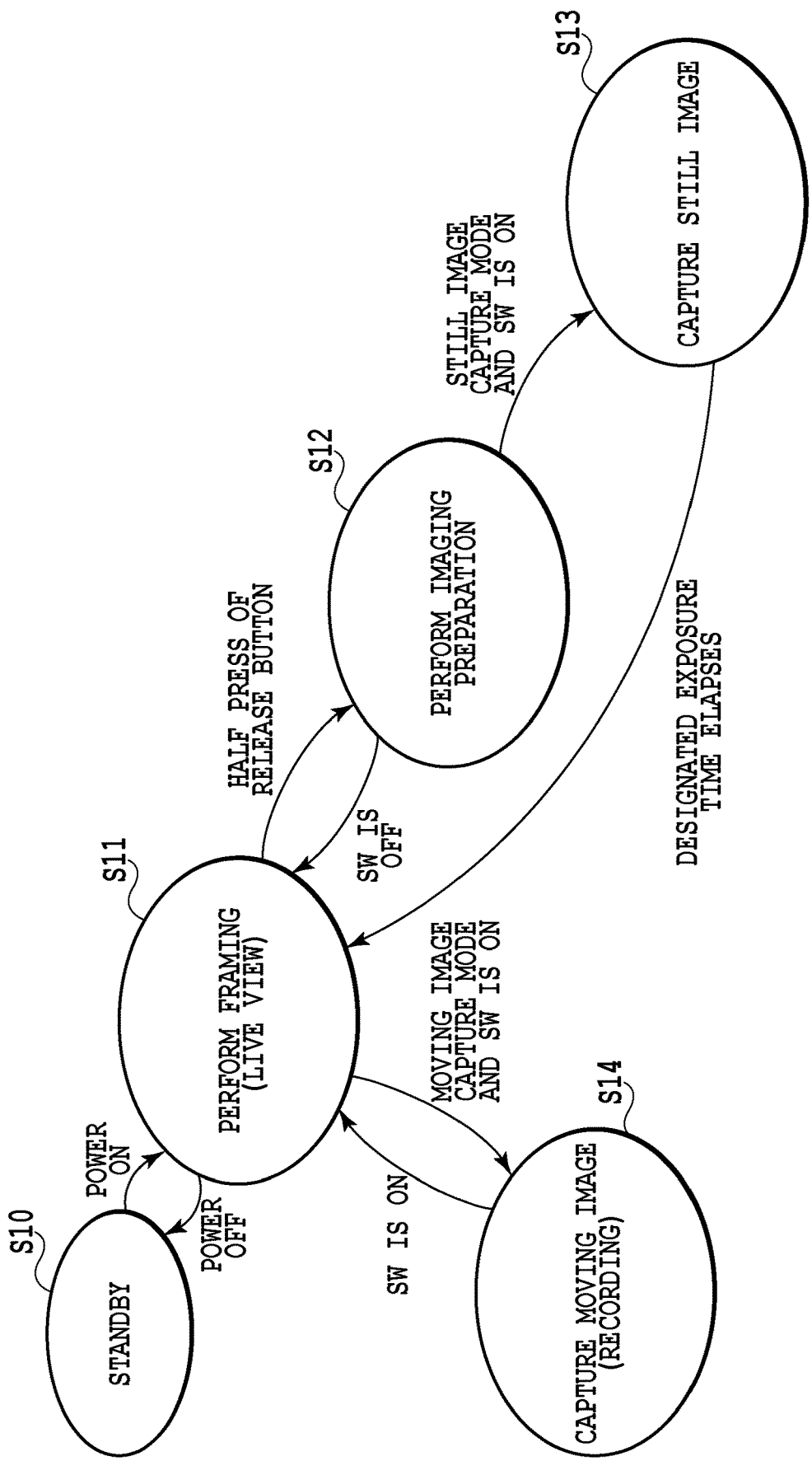
FIG. 5 is a state transition diagram that illustrates state transitions of an imaging apparatus of a multi-eye type.

FIG. 5 is a state transition diagram that illustrates state transitions of the multi-eye camera 100. The operating state of the multi-eye camera 100 transitions between a standby state S10 and a live view state S11 in accordance with an On/Off operation of the power button 109.

In the still image capture mode, generally, there are a framing (live view) state S11, a capture preparation (determine focusing and exposure) state S12, and a still image capturing state S13, and an image is acquired according to a sequence passing through these three states. On the other hand, in the moving image capture mode, when recording is started from the live view state S11, a moving image capturing state S14 is formed, and thereafter, when the recording is stopped, the sequence is returned to the live view state S11, whereby moving image data is acquired.

In a case where the multi-eye camera 100 is in the still image capture mode, in the live view state S11, when the release button 106 is in a state of being pressed up to the middle (half-pressed state), the multi-eye camera 100 is in the capture preparation state S12. In the capture preparation state S12, when the SW 206 is in the On state, the multi-eye camera 100 transits to the still image capturing state S13, and capturing of a still image is started. In addition, the SW 206 becomes a closed state (On state) in a state in which the release button 106 is pressed to the end (full-pressed state). In the still image capturing state S13, when an exposure time determined in the capture preparation state S12 elapses, the multi-eye camera 100 ends the capturing of the still image, and the state transits to the live view state S11. The multi-eye camera 100 stores the captured still image, for example, in the recording medium 214 mounted in the memory card slot 113.

In a case where the multi-eye camera 100 is in the moving image capture mode, in the live view state S11, when the release button 106 is pressed to the end, and the SW 206 is in the On state, the multi-eye camera 100 transits to the moving image capturing state S14, and capturing (recording) of a moving image is started. After the capturing of a moving image is started, when the SW 206 once becomes an open state (Off state) and becomes the On state again, the multi-eye camera 100 stops the capturing of the moving image, and the state transits to the live view state S11. Then, the multi-eye camera 100 stores the moving image acquired through the capturing process, for example, in the recording medium 214 mounted in the memory card slot 113. In addition, a user can change the viewing angle of the imaging lens 102 through a zooming operation.

[Reference Camera Unit Determining Process]

A reference camera unit determining process used when the multi-eye camera 100 performs coding of a captured image of each camera unit will be represented as below.

First, a correlation between a distance from the camera array to a subject (hereinafter, also referred to as a capture object) and the reference camera will be described with reference to FIGS. 6A and 6B.

Figure 6A:
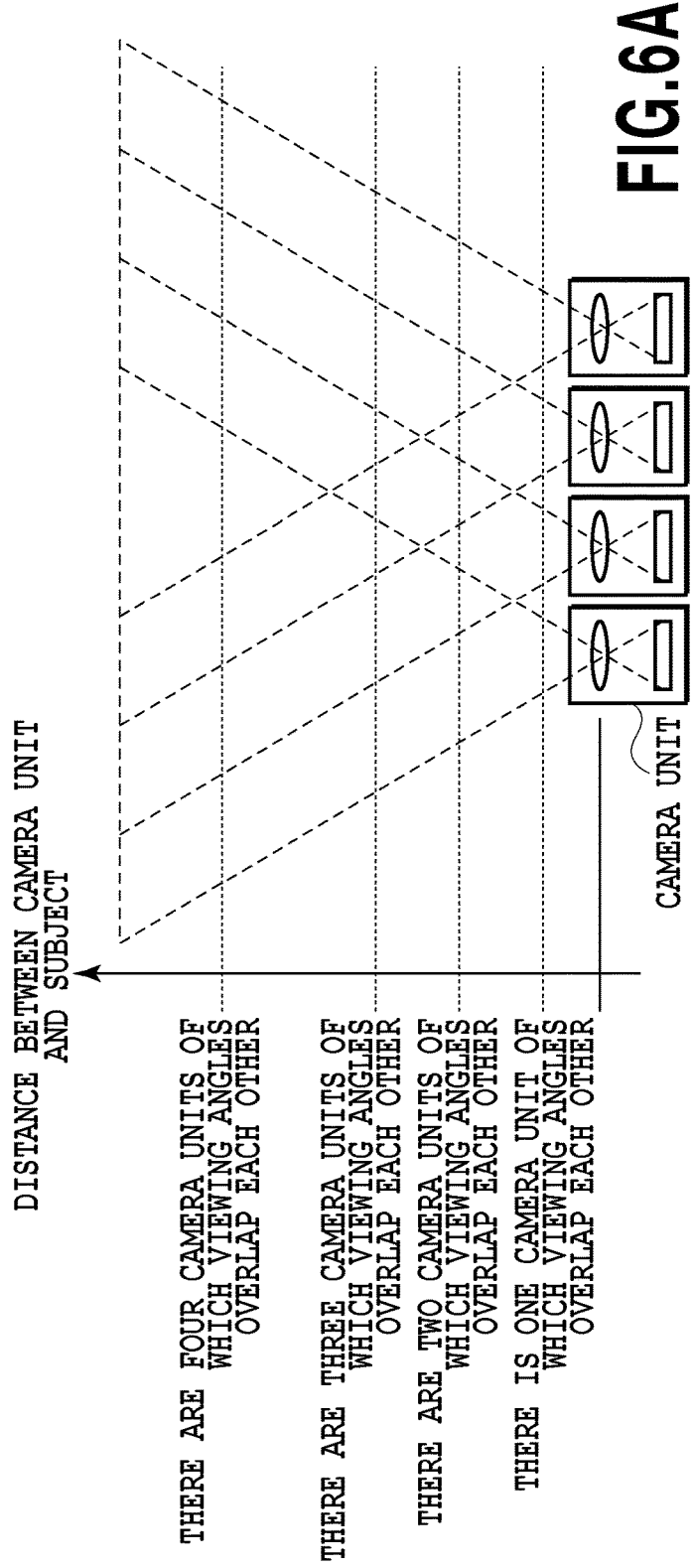
FIGS. 6A and 6B are explanatory diagrams that illustrate a correlation between a distance from a camera array to a subject and a reference camera unit.
Figure 6B:
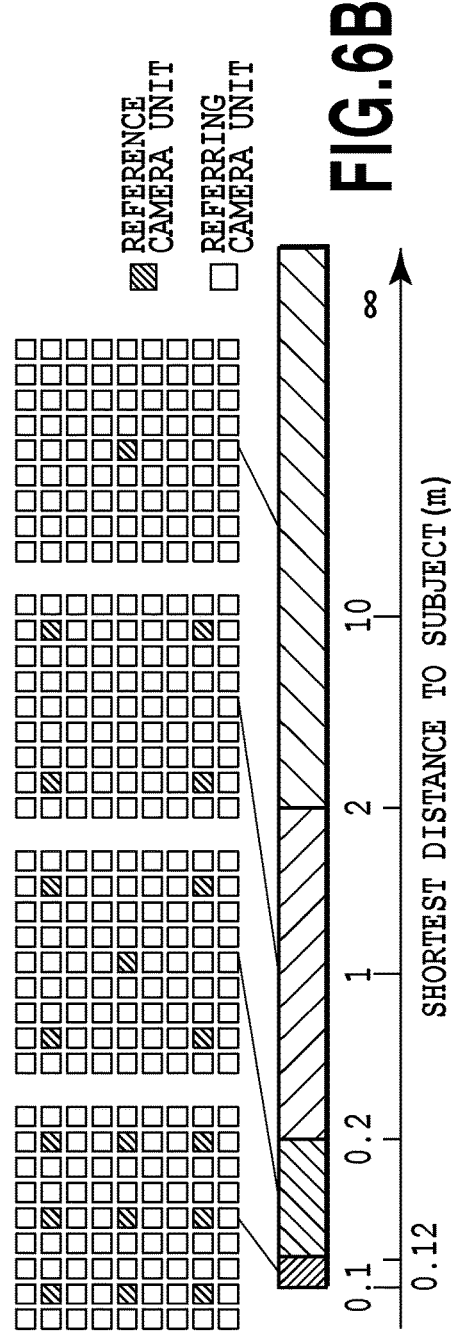

FIGS. 6A and 6B are explanatory diagrams that illustrate a correlation between a distance from the camera array to a subject and the reference camera unit. FIG. 6A illustrates a relation between the distance from the camera array to the subject and the number of camera units of which viewing angles overlap each other. In FIG. 6A, four camera units aligned in the horizontal direction are illustrated as an example. As illustrated in FIG. 6A, as the distance between the camera array and the subject decreases, the number of camera units of which the viewing angles overlap each other decreases. To the contrary, as the distance between the camera array and the subject increases, the number of camera units of which the viewing angles overlap each other increases. A compression rate at the time of predictive coding is performed between camera units changes according to an area in which the viewing angles of the camera units overlap each other. For this reason, the compression rate changes based on the distance between the camera array and the subject. Thus, in this embodiment, as illustrated in FIG. 6B, the number of reference camera units are increased or decreased according to a shortest distance up to the subject. FIG. 6B illustrates a relation between a shortest distance up to a subject and the arrangement of reference camera units in the camera array. In FIG. 6B, a square and a row of the squares, similar to FIG. 3, represent each camera unit 101 and an arrangement thereof. Each black square represents a reference camera unit. On the other hand, each white square represents a referring camera unit.

In order for the multi-eye camera 100 to determine the number of reference camera units, first, the distance estimating unit 215 estimates a distance up to a subject through a distance estimation. In addition, the distance estimating unit 215 transmits closest subject distance information generated based on a result of the estimation to the coding circuit control unit 208. The reference camera unit number determining unit 221 of the coding circuit control unit 208, based on the closest subject distance information, in a case where a distance up to a closest subject is short, increases the ratio of reference camera units to all the camera units. On the other hand, in a case where a distance up to a closest subject is long, the reference camera unit number determining unit 221 decreases the ratio of reference camera units to all the camera units. For example, as illustrated in FIG. 6B, in a case where a distance up to the closest subject is 0.1 m to 0.12 m, 9 camera units out of 81 camera units are determined as reference camera units. Similarly, in a case where a distance up to the closest subject is 0.12 m to 0.2 m, 5 camera units out of 81 camera units are determined as reference camera units. In a case where a distance up to the closest subject is 0.2 m to 2 m, 4 camera units out of 81 camera units are determined as reference camera units. In a case where a distance up to the closest subject is 2 m or more, 1 camera unit out of 81 camera units is determined as a reference camera unit.

The reference camera unit arrangement determining unit 222 determines the arrangement of reference camera units in the camera array in accordance with the determined number of reference camera units. At that time, the reference camera unit arrangement determining unit 222 determines the arrangement of reference camera units in the camera array such that the reference camera units are arranged to be uniformly distributed in the camera array.

Next, the reference camera unit determining process of a case where the number of the reference camera unit is determined to be one will be described with reference to FIGS. 7A and 7B.

Figure 7A:
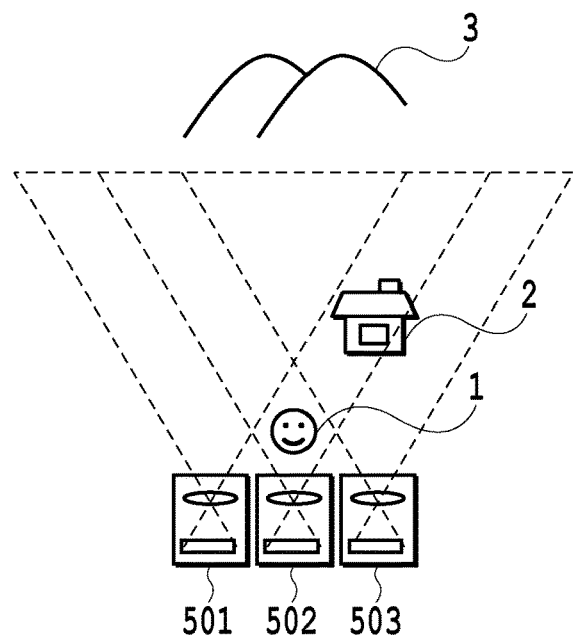
FIGS. 7A and 7B are diagrams that illustrate a reference camera unit determining method in a case where the number of the reference camera unit is determined to be one.
Figure 7B:
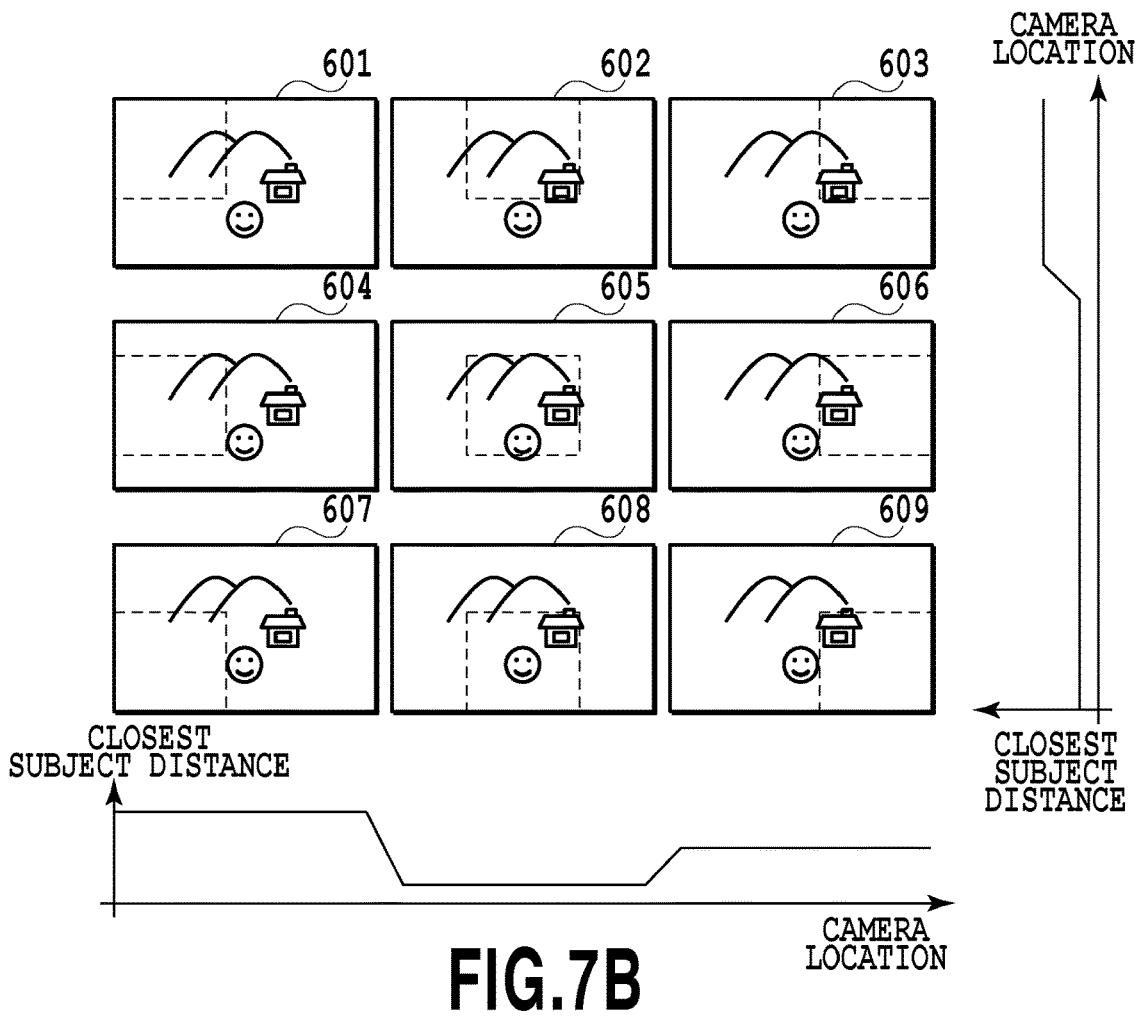

FIGS. 7A and 7B are diagrams that illustrate the reference camera unit determining process in a case where the number of the reference camera unit is determined to be one. In FIG. 7A, an appearance of a multi-eye camera in which camera units are arranged in vertical three columns×horizontal three rows on a same plane at an equal space and subjects 1, 2, and 3 are overlooked from the upper side. In FIG. 7A, while only the camera units 501 to 503 are illustrated, on the lower side thereof, camera units 504 to 506 are arranged. On a further lower side thereof, camera units 507 to 509 are arranged. In other words, the camera units 501 to 503 form a camera unit group arranged on an upper stage of cameras. The camera units 504 to 506 form a camera unit group arranged on a middle stage of cameras. The camera units 507 to 509 form a camera unit group arranged on a lower stage of cameras. Here, while the multi-eye camera in which the camera units are two-dimensionally arranged is illustrated as an example, the camera units may be three-dimensionally arranged. In FIG. 7B, images 601 to 609 are illustrated in which capture ranges of the camera units 501 to 509 are denoted using dotted lines for the whole frame of a panorama image generated by composing captured images captured by the camera units 501 to 509.

A line graph illustrated on the lower side in FIG. 7B represents a distance up to a closest subject calculated for camera units having a same position in the horizontal direction. A line graph illustrated on the right side in FIG. 7B illustrates a distance up to a closest subject that is calculated for camera units having a same position in the vertical direction.

For each camera unit, in a case where a distance up to a closest subject is acquired for each column (for camera units having a same position in the horizontal direction), in a column corresponding to the camera units 501, 504, and 507, as illustrated in images 601, 604, and 607, a subject 3 is the closest subject. In addition, in a column corresponding to the camera units 502, 505, and 508, as illustrated in images 602, 605, and 608, a subject 1 is the closest subject. Furthermore, in a column corresponding to the camera units 503, 506, and 509, as illustrated in images 603, 606, and 609, a subject 2 is the closest subject.

Similarly, for each camera unit, in a case where a distance up to a closest subject is acquired for each row (for camera units having a same position in the vertical direction), in a row corresponding to the camera units 501 to 503, as illustrated in images 601 to 603, a subject 2 is the closest subject. In addition, in a row corresponding to the camera units 504 to 506, as illustrated in images 604 to 606, a subject 1 is the closest subject. Furthermore, in a row corresponding to the camera units 507 to 509, as illustrated in images 607 to 609, a subject 1 is the closest subject.

As above, a column in which the closest subject distance in the horizontal direction is shortest is a center column. In addition, rows in which the closest subject distance in the vertical direction is shortest are a middle row and a lower stage row. The coding circuit control unit 208 (more specifically, the reference camera unit arrangement determining unit 222 of the coding circuit control unit 208) determines one of camera units (the camera unit 505 and the camera unit 508) arranged at a position at which the row having a smallest closest subject distance and the column having a smallest closest subject distance intersect each other as the reference camera unit. The determination of a camera unit as the reference camera unit that is made by the reference camera unit arrangement determining unit 222 is performed based on a method determined in advance such as selection of a camera unit that is located closer to a center camera unit (a camera unit arranged near the center of all the camera units). In addition, in a case where the number of the reference camera unit is determined to be one, all the subjects are located at a sufficiently distant view, and a difference between the camera units is not large. Accordingly, there is no problem even in a case where the reference camera unit is set at a position deviating to one side in the camera array.

In this embodiment, for example, a camera unit arranged at a position at which a row having a smallest closest subject distance and a column having a smallest closest subject distance intersect each other is specified as below. First, the distance estimating unit 215 estimates a shortest distance up to a subject included in a capture range of each camera unit for each camera unit. Then, the coding circuit control unit 208 specifies a camera unit having an estimated smallest shortest distance from among camera units and determines the specified camera unit as the reference camera unit.

Here, a reference camera unit determining method used in a multi-eye camera including camera units having mutually-different viewing angles will be described.

Figure 8:
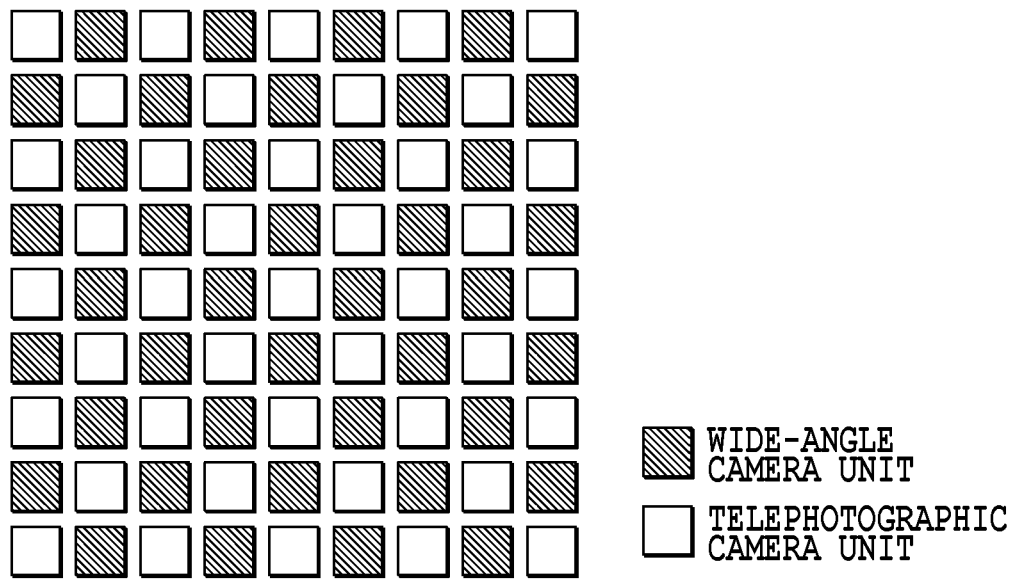
FIG. 8 is an explanatory diagram that illustrates an appearance in which camera units having mutually-different viewing angles are alternately arranged.

FIG. 8 is an explanatory diagram that illustrates an appearance in which camera units having mutually-different viewing angles (wide-angle camera units and telephotographic cameras) are alternately arranged. As illustrated in FIG. 8, in a case where camera units having mutually-different viewing angles are arranged, the coding circuit control unit 208 performs the reference camera unit determining process described above for the camera units having the same viewing angle. Accordingly, each reference camera unit is determined from among the wide-angle camera units and from among the telephotographic camera units. In addition, similarly, regarding a coding process, a coding process flow to be described later is performed for the cameras having the same viewing angle. In FIG. 8, while two kinds of camera units are illustrated as an example, in the multi-eye camera, three or more kinds of camera units may be included as the cameras having mutually-different viewing angles.

[Coding Process Flow]

Figure 9:
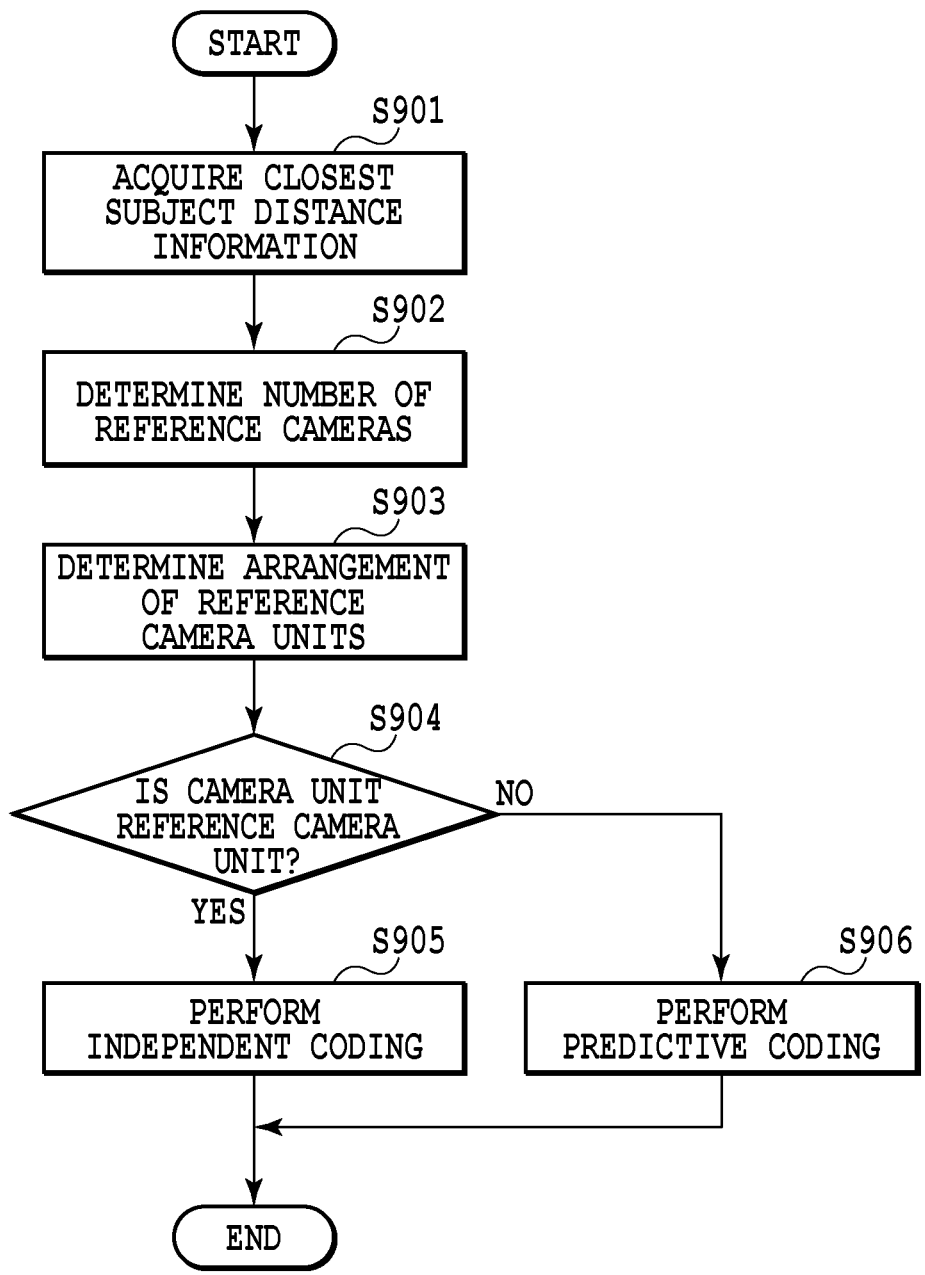
FIG. 9 is a flowchart that illustrates a coding process performed by the coding circuit control unit.

A coding process flow will be described with reference to FIG. 9. FIG. 9 is a flowchart that illustrates a coding process performed by the coding circuit control unit 208.

First, the subject distance information acquiring unit 220 of the coding circuit control unit 208 receives the closest subject distance information from the distance estimating unit 215 (Step S901). Then, the reference camera unit number determining unit 221 determines the number of reference camera units based on the closest subject distance information (Step S902). Next, the reference camera unit arrangement determining unit 222 determines the arrangement of the reference camera units in the camera array (Step S903). Particularly, in a case where the number of the reference camera units is one, the reference camera unit arrangement determining unit 222 determines the arrangement of the reference camera unit in the camera array based on the method described above. The coding control unit 223, based on a result of the determination made by the reference camera unit arrangement determining unit 222, transmits the control signal used for determining whether each camera unit is a reference camera unit or a referring camera unit to the captured image acquiring unit 224 of the coding circuit 207.

The captured image acquiring unit 224 transmits image data received from the image processing circuit 204 in accordance with the received control signal (Step S904). More specifically, in a case where the control signal is a signal used for operating the own camera unit as the referring camera unit (No in Step S904), the captured image acquiring unit 224 transmits the image data to the predictive coding unit 225. On the other hand, in a case where the control signal is a signal used for operating the own camera unit as the reference camera unit (Yes in Step S904), the captured image acquiring unit 224 transmits the image data to the independent coding unit 226.

In the reference camera unit, the independent coding unit 226 performs independent coding of the image data received from the captured image acquiring unit 224 by using only the information of the own camera unit (Step S905). On the other hand, in the referring camera unit, the predictive coding unit 225 performs predictive coding by using information of a closest reference camera unit (Step S906). The predictive coding process performed at this time will be described later. In a case where two or more reference camera units that are closest from the referring camera unit are present, the predictive coding unit 225 selects a reference camera unit determined in advance and performs the predictive coding.

Figure 10:
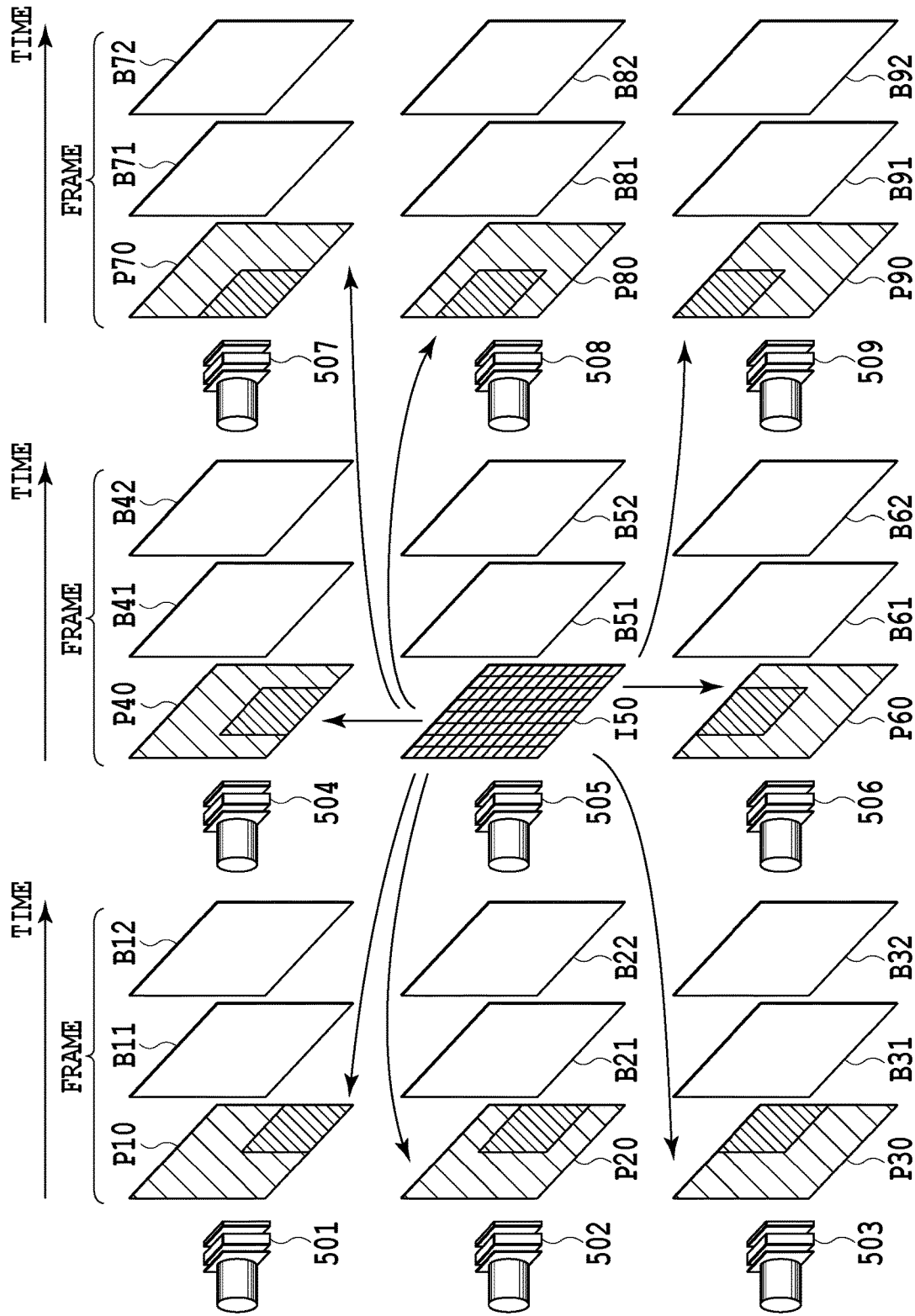
FIG. 10 is a diagram that illustrates a predictive coding process of moving image data captured at a plurality of viewpoints.

Here, a process performed in a case where image data is continuously coded as in the case of capturing a moving image will be described. FIG. 10 is a diagram that illustrates a predictive coding process of moving image data captured at a plurality of viewpoints. The configuration of camera units illustrated in FIG. 10 is the same as that illustrated in FIGS. 7A and 7B. In the example illustrated in FIG. 10, the camera unit 505 is selected as the reference camera unit. Accordingly, the video sequence of the camera unit 505 is independently coded. On the other hand, for camera units 501 to 504 and 506 to 509 that are referring camera units, predictive coding is performed by referring to a coded video sequence of the camera unit 505. I50 illustrated in FIG. 10 is an I picture and represents a frame that is independently coded. On the other hand, P10, P20, P30, P40, P60, P70, P80, and P90 illustrated in FIG. 10 are P pictures, are frames at the same timing as that of I50, and represent frames that are performed predictive coding using I50. In other words, I50 is a reference frame of P10, P20, P30, P40, P60, P70, P80, and P90. The coding of next frames (B pictures) B11, B21, B31, B41, B61, B71, B81, and B91 of the camera units 501 to 504 and 506 to 509 other than the reference camera unit, for example, is performed through an inter-frame prediction referring to different frames (for example, previous and next frames) for each camera unit. In addition, the coding of B11, B21, B31, B41, B61, B71, B81, and B91 may be performed through predictive coding between camera units by using a frame B51 of the same timing of the camera unit 505.

[Distance Estimating Process]

Figure 11:
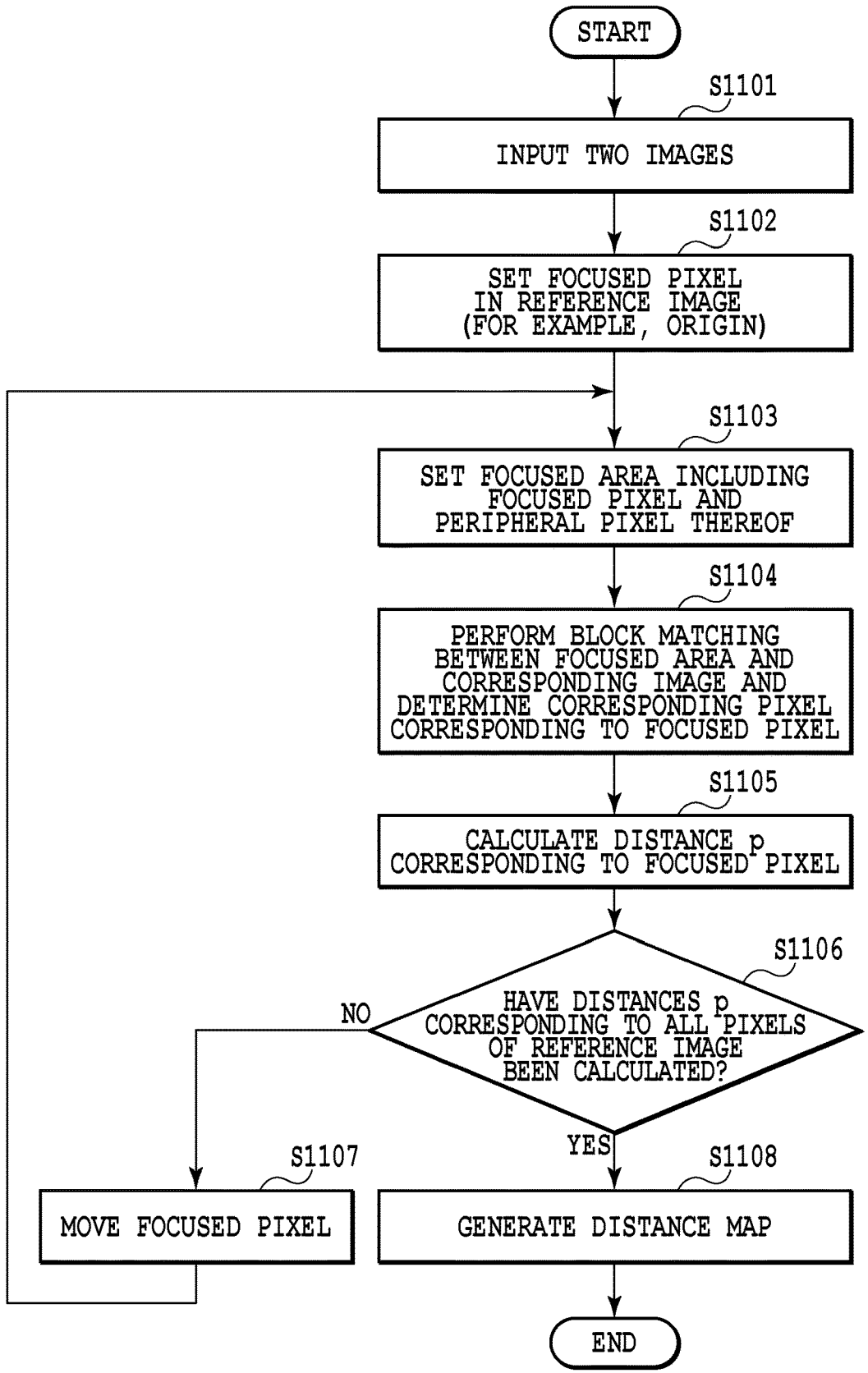
FIG. 11 is a flowchart that illustrates a distance estimating process performed by a distance estimating unit.
Figure 12A:
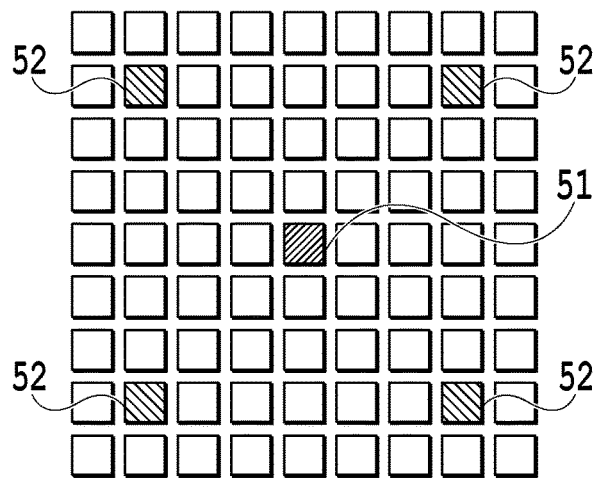
FIGS. 12A to 12C are diagrams that illustrate a distance estimating process.
Figure 12B:
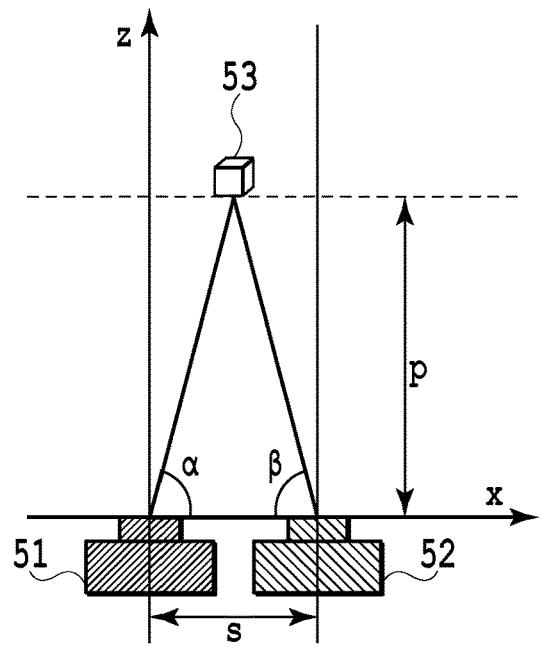
Figure 12C:
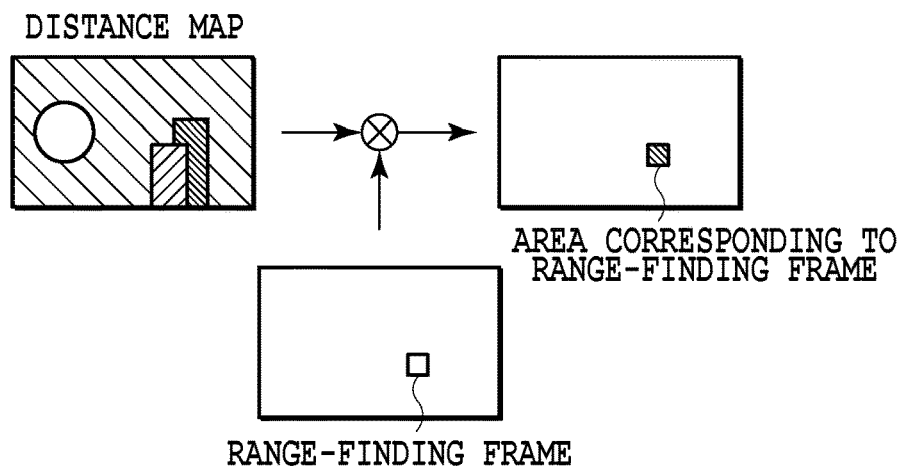

The distance estimating unit 215 generates a distance map (depth image) by estimating a distance up to a subject on a captured scene based on multi-viewpoint images captured by the multi-eye camera 100. In this embodiment, the subject on the captured scene is a subject within a frame of a panorama image generated by composing multi-viewpoint images. As the distance estimating method, any one of a stereo method, a multi baseline stereo method, and the like may be used. In this embodiment, the distance estimating unit 215 performs distance estimation according to the stereo method. FIG. 11 is a flowchart that illustrates a distance estimating process performed by the distance estimating unit 215. FIGS. 12A to 12C are diagrams that illustrate the distance estimating process.

The distance estimating unit 215 receives two images selected from among the multi-viewpoint images by the CPU 200 as input (Step S1101). In FIG. 12A, a square and a row of squares, similar to FIGS. 4A to 4D, represent each camera unit and the arrangement thereof. The CPU 200, for example, as illustrated in FIG. 12A, selects an image captured by a center camera unit 51 (hereinafter, referred to as a reference image) and an image captured by one arbitrary camera unit among camera units 52 used for distance estimation (hereinafter, referred to as a corresponding image) as images used for distance estimation.

Next, the distance estimating unit 215 sets a focused pixel at an arbitrary point (for example, the origin) of the reference image (Step S1102) and sets a focused area that includes the focused pixel and peripheral pixels thereof (Step S1103). Then, the distance estimating unit 215 performs block matching between the focused area and the corresponding image and determines a pixel (corresponding pixel) of the corresponding image that corresponds to the focused pixel (Step S1104).

Next, the distance estimating unit 215 calculates a distance p corresponding to the focused pixel based on the viewing angle of the camera unit 52 that has captured the corresponding image, imaging apparatus information representing a relative position from the center camera unit 51 and the like, and coordinates of the focused pixel and the corresponding pixel (Step S1105).

In FIG. 12B, an appearance of the center camera unit 51, the camera unit 52, and the subject 53 are overlooked from the upper side is illustrated. In FIG. 12B, the x axis represents a direction parallel to a plane in which the camera units are arranged. In addition, the z axis represents the direction of a normal line of the plane on which the camera units are arranged. A distance p between each camera unit and the subject 53 is calculated using the following equation.

$$p = \{\sin \alpha \cdot \sin \beta / \sin(\pi - \alpha - \beta)\}s$$

Here, the angle $\alpha$ is calculated based on the horizontal viewing angle of the center camera unit 51, the capture position of the reference image, and the coordinates of the focused pixel. In addition, the angle $\beta$ is calculated based on the horizontal viewing angle of the camera unit 52 used for the distance estimation, the capture position of the corresponding image and the coordinates of the corresponding pixel. The distance s is a distance between the center camera unit 51 and the camera unit 52 and is calculated based on the capture positions of the reference image and the corresponding image.

Next, the distance estimating unit 215 determines whether or not the distances p corresponding to all the pixels of the reference image have been calculated (Step S1106). In a case where there is a pixel for which the distance has not been calculated (No in Step S1106), the distance estimating unit 215 moves the focused pixel (Step S1107), and the process is returned to the process of Step S1103. On the other hand, in a case where the distances p corresponding to all the pixels of the reference image have been calculated (Yes in Step S1106), the distance estimating unit 215 generates a distance map in which the distance p corresponding to each pixel is associated with a pixel value of each pixel (Step S1108).

In addition, the distance estimating unit 215 estimates a distance from the camera array up to a closest subject based on the distance map generated through the process described above.

A capture distance is determined based on the distance map generated through the process described above. For example, the CPU 200 acquires an area on the distance map that corresponds to a range-finding frame that is separately designated through a user operation or the like and determines a capture distance by using the distance information within the area. In FIG. 12C, an appearance of acquiring an area on the distance map that corresponds to a range-finding frame is illustrated.

[Predictive Coding Process]

After the coding circuit control unit 208 performs the reference camera unit determining process described above, the predictive coding unit 225 of the coding circuit 207 of the referring camera unit performs a position matching process between the image data of the reference camera unit and the image data of the own camera unit. Thereafter, the predictive coding unit 225 performs a predictive coding process by using the information of the reference camera unit. In the predictive coding process, any one of a simple differential method, a composite differential method, and the like may be used. The position matching process is a process for resolving deviations in an area in which the image data of the reference camera unit and the image data of the own camera unit overlap each other. For example, the predictive coding unit 225 associates pixels corresponding to a same subject with each other in the area in which the image data of the reference camera unit and the image data of the own camera unit overlap each other and resolves deviations in the area.

Figure 13:
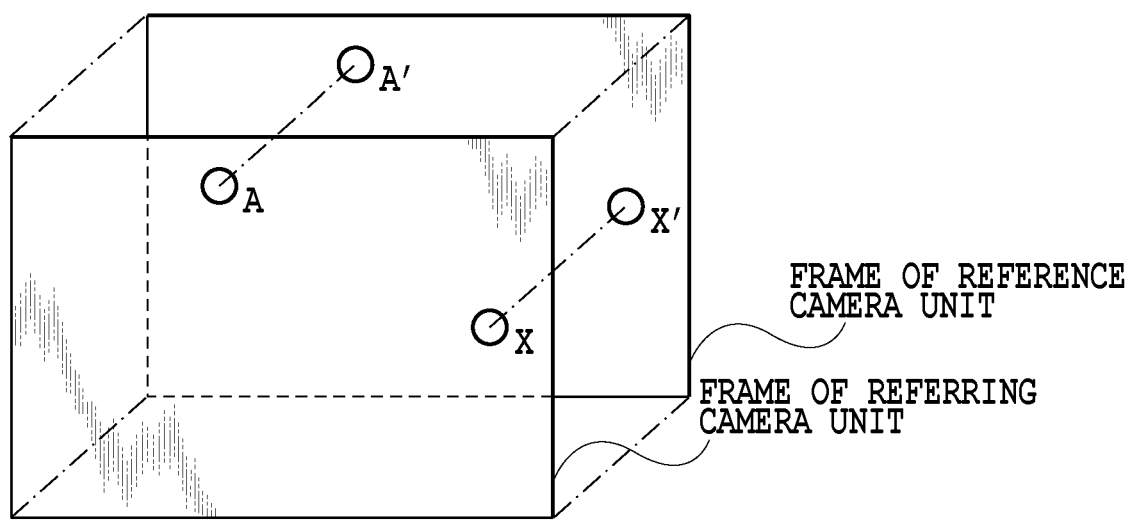
FIG. 13 is a diagram that illustrates a predictive coding process using difference processing.

FIG. 13 is a diagram that illustrates the predictive coding process using differential processing. In a case where predictive coding of points (points X and A illustrated in FIG. 13) within a frame captured by the referring camera unit is performed by using points (points X' and A' illustrated in FIG. 13) within a frame that is a frame captured by the reference camera unit and is independently coded, the predictive coding unit 225, for example, uses the following equations.

Simple Differential Method $$\Delta = X - X'$$

Composite Differential Method $$\Delta = X - A - (X' - A')$$

Figure 14:
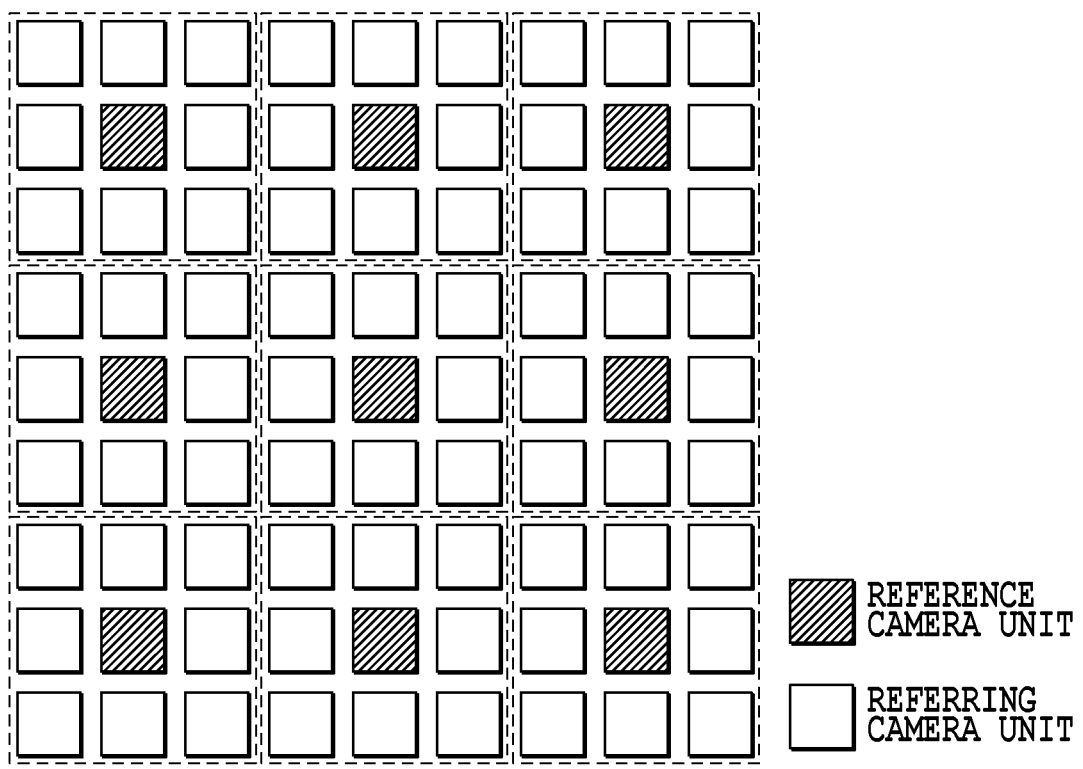
FIG. 14 is an explanatory diagram that illustrates a range of a referring camera unit corresponding to a reference camera unit.

FIG. 14 is an explanatory diagram that illustrates a range of the referring camera unit corresponding to the reference camera unit. In FIG. 14, each portion enclosed by broken lines represents a range of referring camera units that performs coding using a same reference camera unit. The referring camera unit (more specifically, the predictive coding unit 225 of the referring camera unit) performs predictive coding by using the information of the reference camera unit located at a shortest distance. When two or more reference camera units are located at a same distance from the referring camera unit, the predictive coding unit 225 of the referring camera unit performs coding using the information of a reference camera determined in advance.

In addition, the coding circuit control unit 208 monitors a compression rate according to the predictive coding at the time of capturing a moving image or at the time of framing and, in a case where the compression rate is a threshold or less, determines the number and the arrangement of reference camera units again. Then, the coding circuit control unit 208 transmits the control signal to each camera unit based on the number and the arrangement of the reference cameras determined again.

As described above, according to this embodiment, the number and the arrangement of reference camera units are determined in accordance with a distance up to a subject. Then, a referring camera unit performs coding by referring to the information of a reference camera unit located closest to the own camera unit. Accordingly, unlike the technique disclosed in Japanese Patent Laid-Open No. 2007-184741, it is not necessary to sequentially perform a coding process from a base video camera to peripheral video cameras, and therefore, the coding process can be performed at a high speed. In this way, real time processing required in communication between blocks, for example, data transmission from imaging systems (camera units 101-1 to 101-n) to a developing system (image processing unit 211) can be secured.

In addition, in this embodiment, the number and the arrangement of reference cameras are determined according to a distance up to a subject, and an area in which the viewing angle of the reference camera unit and the viewing angle of the referring camera unit overlap each other is adjusted. Thus, according to this embodiment, the compression rate at the time of coding between the reference camera unit and the referring camera unit can be raised, and the amount of data can be suppressed.

Furthermore, in this embodiment, since the position matching process between the image data of the reference camera unit and the image data of the referring camera unit is performed, the amount of data can be further suppressed.

In addition, according to this embodiment, not raw image data but image data coded by the coding circuit 207 is transmitted to the developing system, and accordingly, a communication load between the imaging system and the developing system can be decreased.

Furthermore, in this embodiment, while the coding circuit 207 is arranged inside the imaging system, the coding circuit 207 may be arranged outside the imaging system. According to such a configuration, this embodiment can be applied also to a multi-eye camera system in which multi-viewpoint images acquired from existing video cameras are processed by a server disposed outside or the like. For example, this embodiment can be applied to a multi-eye camera system that includes a plurality of video cameras, an apparatus coding image data output from each of the video cameras (multi-viewpoint image coding apparatus), and a server performing image processing for coded image data. In such a case, in the multi-viewpoint image coding apparatus, at least, the coding circuit 207, the coding circuit control unit 208, and the distance estimating unit 215 may be mounted. Then, the multi-viewpoint image coding apparatus may transmit the coded image data to the server. At this time, it may be configured such that a plurality of coding circuits corresponding to the number of video cameras are mounted, and each coding circuit codes image data of a corresponding video camera. Alternatively, it may be configured such that only one coding circuit is mounted, and the coding circuit codes image data of each video camera.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a process of coding multi-viewpoint images, the process can be performed at a high speed while the amount of data is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-183346, filed Sep. 16, 2015, which is hereby incorporated by reference wherein in its entirety.

What is claimed is:

1. A multi-viewpoint image coding apparatus coding image data, which has a different viewpoint, acquired from each of a plurality of camera units, the multi-viewpoint image coding apparatus comprising:
   one or more processors;
   a memory including instructions that, when executed by the one or more processors, cause the multi-viewpoint image coding apparatus to function as:
   a distance estimating unit that estimates a distance from a camera array including the plurality of camera units up to a subject;
   a first coding unit that independently codes image data to be processed;
   a second coding unit that codes the image data to be processed with reference to image data of another camera unit among the plurality of camera units; and
   a control unit that performs control to operate coding each of a plurality of pieces of image data based on the distance,
   wherein the control unit determines which of the first coding unit and the second coding unit codes each image data output from each camera unit that has captured the subject based on the distance, and
   wherein the distance estimating unit estimates the distance from each of the camera units up to the subject,
   wherein the control unit sets a camera unit corresponding to image data to be coded by the first coding unit as a reference camera unit, a number of the reference camera unit being one, and
   wherein the control unit calculates a distance up to a closest subject included in a capture range for each camera unit and determines a camera unit having a smallest distance up to the subject as a first camera unit.

2. The multi-viewpoint image coding apparatus according to claim 1, wherein
   the control unit sets a camera unit corresponding to image data to be coded by the first coding unit as a reference camera unit, and
   the control unit sets a number of reference camera units to be increased as the distance up to the subject decreases.

3. The multi-viewpoint image coding apparatus according to claim 1, wherein the control unit sets a camera unit corresponding to image data to be coded by the first coding unit as a reference camera unit,
   wherein a number of the plurality of pieces of image data to be coded by the first coding unit is two or more,
   wherein the control unit determines the arrangement of the reference camera units in the camera array such that the reference camera units are arranged to be uniformly distributed in the camera array.

4. The multi-viewpoint image coding apparatus according to claim 3, wherein the control unit performs control to operate the second coding unit to code image data of a camera unit other than the reference camera unit by referring to image data of a first camera unit that is arranged closest from an own camera unit.

5. The multi-viewpoint image coding apparatus according to claim 1, wherein image data is moving image data,
   wherein the control unit sets a camera unit corresponding to image data to be coded by the first coding unit as a reference camera unit,
   wherein the second coding unit performs coding for a frame of same timing as timing of an I picture of the reference camera unit by referring to the I picture of the reference camera unit and performs coding for a frame of timing different from the timing of the I picture of the reference camera unit by referring to previous and next frames of the frame.

6. A multi-viewpoint image coding method for coding image data, which has a different viewpoint, acquired from each of a plurality of camera units, the multi-viewpoint image coding method comprising:
   estimating a distance from a camera array including the plurality of camera units up to a subject;
   independently coding, by a first coding unit, image data to be processed;
   coding, by a second coding unit, image data to be processed with reference to image data of another camera unit among the plurality of camera units; and
   performing control to operate coding each of a plurality of pieces of image data based on the distance,
   wherein it is determined which of the first coding unit and the second coding unit codes each image data output from each camera unit that has captured the subject based on the distance, and
   wherein the distance from each of the camera units up to a subject is estimated,
   wherein a camera unit corresponding to image data to be coded is set as a reference camera unit, a number of the reference camera unit being one, and
   wherein a distance up to a closest subject included in a capture range for each camera unit is calculated and a camera unit having a smallest distance up to the subject is determined as a first camera unit.

7. A non-transitory computer readable storage medium storing a program for causing a computer to perform a multi-viewpoint image coding method for coding image data, which has a different viewpoint, acquired from each of a plurality of camera units, the method comprising the step of:
   estimating a distance from a camera array including the plurality of camera units up to a subject;
   independently, by a first coding unit, coding image data to be processed;
   coding, by a second coding unit, image data to be processed with reference to image data of another camera unit among the plurality of camera units; and
   performing control to operate coding each of a plurality of pieces of image data based on the distance,
   wherein it is determined which of the first coding unit and the second coding unit codes each image data output from each camera unit that has captured the subject based on the distance, and
   wherein the distance from each of the camera units up to a subject is estimated,
   wherein a camera unit corresponding to image data to be coded is set as a reference camera unit, a number of the reference camera unit being one, and
   wherein a distance up to a closest subject included in a capture range for each camera unit is calculated and a camera unit having a smallest distance up to the subject is determined as a first camera unit.

8. The multi-viewpoint image coding apparatus according to claim 1, wherein
   the control unit performs control to operate the first coding unit to code image data referred to by the second coding unit.

* * * * *